United States Patent
Lavy et al.

(10) Patent No.: US 10,558,713 B2
(45) Date of Patent: Feb. 11, 2020

(54) METHOD OF TUNING A COMPUTER SYSTEM

(71) Applicant: ResponsiML Ltd, London (GB)

(72) Inventors: Matthew Lavy, London (GB); Alistair Turnbull, Cambridge (GB)

(73) Assignee: ResponsiML Ltd, London (GB)

( * ) Notice: Subject to any disclaimer, the term of this patent is extended or adjusted under 35 U.S.C. 154(b) by 0 days.

(21) Appl. No.: 16/149,523

(22) Filed: Oct. 2, 2018

(65) Prior Publication Data

US 2020/0019615 A1    Jan. 16, 2020

Related U.S. Application Data

(60) Provisional application No. 62/697,679, filed on Jul. 13, 2018.

(51) Int. Cl.
| | |
|---|---|
| *G06F 17/30* | (2006.01) |
| *G06F 16/93* | (2019.01) |
| *G06N 7/00* | (2006.01) |
| *G06N 20/00* | (2019.01) |

(52) U.S. Cl.
CPC ............ *G06F 16/93* (2019.01); *G06N 7/005* (2013.01); *G06N 20/00* (2019.01)

(58) Field of Classification Search
CPC ........................... G06F 17/30011; G06F 16/93
USPC ....................................................... 707/737
See application file for complete search history.

(56) References Cited

U.S. PATENT DOCUMENTS

| | | | | |
|---|---|---|---|---|
| 5,867,799 | A * | 2/1999 | Lang ..................... | G06F 16/337 |
| 2004/0111678 | A1* | 6/2004 | Hara ..................... | G06F 16/374 715/273 |
| 2008/0065471 | A1* | 3/2008 | Reynolds ............... | G06Q 10/06 705/7.32 |
| 2008/0140684 | A1* | 6/2008 | O'Reilly ............... | G06F 16/353 |
| 2010/0076949 | A1* | 3/2010 | Zoeter .................. | G06F 16/951 707/706 |
| 2010/0161534 | A1* | 6/2010 | Sellamanickam ..... | G06N 20/00 706/46 |
| 2010/0250497 | A1* | 9/2010 | Redlich ................... | F41H 13/00 707/661 |
| 2010/0262571 | A1* | 10/2010 | Schmidtler ............ | G06N 20/00 706/12 |
| 2010/0317420 | A1* | 12/2010 | Hoffberg ............ | G06Q 30/0207 463/1 |
| 2014/0079297 | A1* | 3/2014 | Tadayon .................. | G06K 9/00 382/118 |
| 2014/0129261 | A1* | 5/2014 | Bothwell ............... | G06N 20/00 705/4 |
| 2014/0143188 | A1* | 5/2014 | Mackey ................. | G06N 7/005 706/12 |
| 2014/0201126 | A1* | 7/2014 | Zadeh .................... | G06N 7/005 706/52 |

(Continued)

*Primary Examiner* — Mark E Hershley
(74) *Attorney, Agent, or Firm* — IPro, PLLC; Qian Gu

(57) ABSTRACT

Disclosed herein is a method for tuning a computer system suitable for classifying documents or to locating texts satisfying a criterion in documents. Examples of the computer system may be used for electronic discovery or to exercise due diligence in a transaction. The method includes obtaining a target of accuracy of the computer system and tuning the accuracy of the computer system by adjusting a characteristic of the computer system based on the target.

26 Claims, 11 Drawing Sheets

(56) References Cited

U.S. PATENT DOCUMENTS

| | | | |
|---|---|---|---|
| 2015/0019204 A1* | 1/2015 | Simard | G06F 17/2785 |
| | | | 704/9 |
| 2016/0078022 A1* | 3/2016 | Lisuk | G06F 3/04842 |
| | | | 706/12 |
| 2016/0210602 A1* | 7/2016 | Siddique | G06Q 20/0453 |
| 2016/0335351 A1* | 11/2016 | Volkovs | G06F 16/951 |
| 2017/0177907 A1* | 6/2017 | Scaiano | G06N 7/005 |
| 2017/0235848 A1* | 8/2017 | Van Dusen | H04L 41/04 |
| | | | 705/12 |
| 2017/0286521 A1* | 10/2017 | Singh | H04L 63/1425 |
| 2017/0329972 A1* | 11/2017 | Brisebois | G06F 21/6218 |
| 2018/0165554 A1* | 6/2018 | Zhang | G06K 9/6269 |
| 2018/0173698 A1* | 6/2018 | Dubey | G06F 16/3347 |
| 2018/0189269 A1* | 7/2018 | Quirk | G06F 17/2775 |
| 2018/0204111 A1* | 7/2018 | Zadeh | G06N 3/0436 |
| 2018/0239959 A1* | 8/2018 | Bui | G06F 3/0484 |
| 2018/0240031 A1* | 8/2018 | Huszar | G06F 16/22 |
| 2018/0285340 A1* | 10/2018 | Murphy | G06F 17/278 |
| 2018/0300315 A1* | 10/2018 | Leal | G06F 16/355 |
| 2019/0080383 A1* | 3/2019 | Garcia Duran | G06Q 30/0631 |

* cited by examiner

METHOD OF TUNING A COMPUTER SYSTEM

BACKGROUND

A computer system that classifies or searches documents containing texts in natural languages or graphics based on the meanings conveyed by the texts or graphics can be useful in many areas. The texts may include numerals, formulas or other suitable forms. The graphics may include drawings, photos, diagrams, charts or other suitable forms. However, neither natural languages nor graphics are completely accurate. For example, one word may have multiple meanings; multiple words may have the same meaning; and the meaning of a word, phrase, sentence or graphic may be affected by the context or the tone of the author. Further, the meanings conveyed by a document may depend on information extrinsic to the document itself. For example, a reader's prior experience or mood may affect perception of graphics and texts in a document. The inaccuracy of natural languages and graphics or the effect of extrinsic information may lead to errors of the computer system. The errors may cause significant legal or financial risks to a user of the computer system.

SUMMARY

Disclosed herein is a method comprising: obtaining a target of accuracy of a computer system configured to classify documents or to locate texts satisfying a criterion in documents; tuning the accuracy of the computer system by adjusting a characteristic of the computer system based on the target.

According to an embodiment, obtaining the target is based on a measure of risks caused by errors of the computer system.

According to an embodiment, the method further comprises determining a measure of the accuracy; wherein adjusting the characteristic comprises comparing the measure with the target.

According to an embodiment, the characteristic is an amount of training of the computer system.

According to an embodiment, the characteristic is an amount of output validation of the computer system.

According to an embodiment, the computer system is configured to iteratively receive validated data and wherein the characteristic is an amount of the validated data.

According to an embodiment, the characteristic is a bias of the computer system.

According to an embodiment, the computer system comprises a plurality of nodes, the nodes comprising one or more processors; wherein the characteristic is an attribute of couplings among the nodes.

According to an embodiment, the computer system is configured to classify the documents into a plurality of classes.

According to an embodiment, the computer system is probabilistic.

According to an embodiment, the accuracy is a function of true positives, false positives, true negatives or false negatives of the computer system, or a function of the number of true positives, false positives, true negatives or false negatives of the computer system.

According to an embodiment, the accuracy is a function of precision, recall or F-score of the computer system with respect to a class.

Disclosed herein is a computer program product comprising a non-transitory computer readable medium having instructions recorded thereon, the instructions when executed by a computer implementing any of methods above.

DETAILED DESCRIPTION

Figure 1A:
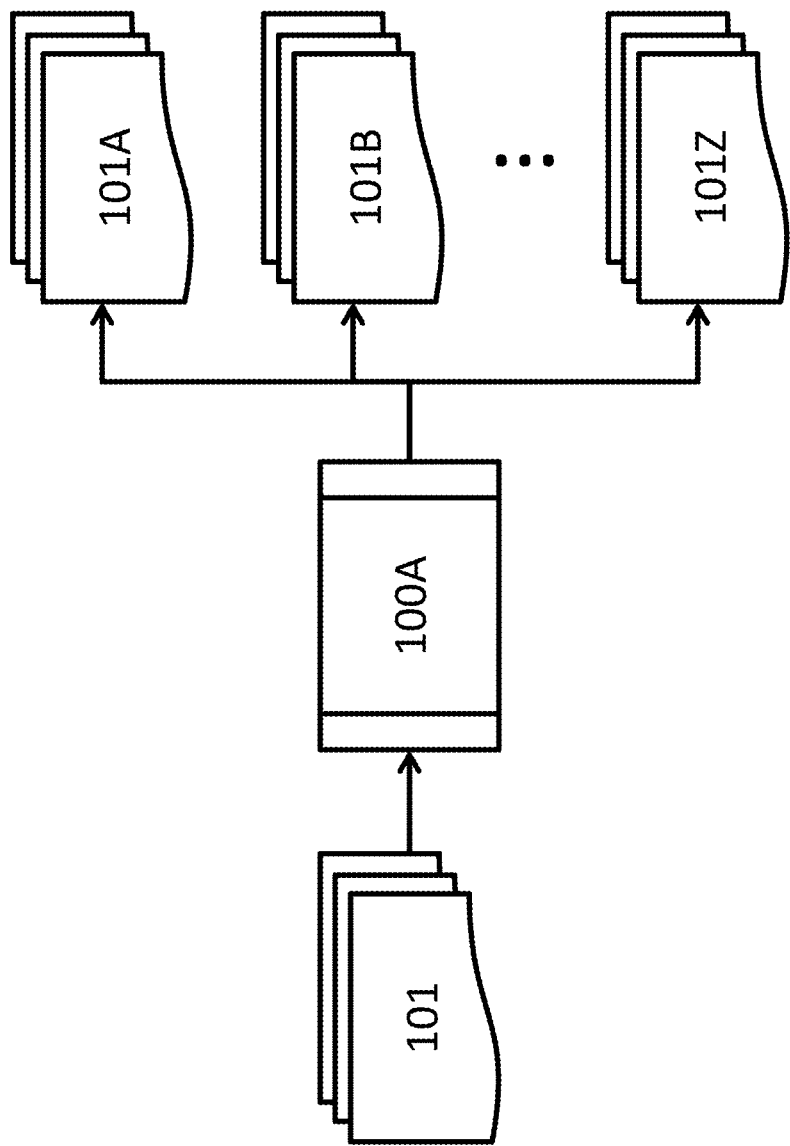
FIG. 1A schematically shows the function of a computer system that classifies documents based on their contents.

FIG. 1A schematically shows the function of a computer system 100A that classifies documents based on their contents. The computer system 100A receives multiple documents 101, analyzes the contents of the documents 101, and allocates the documents 101 into two or more classes (e.g., 101A, 101B, . . . , 101Z) based on the contents. The computer system 100A may be used, for example, for electronic discovery, where the computer system 100A determines whether each of the documents 101 is relevant to a particular case or a particular issue in a case.

Figure 1B:
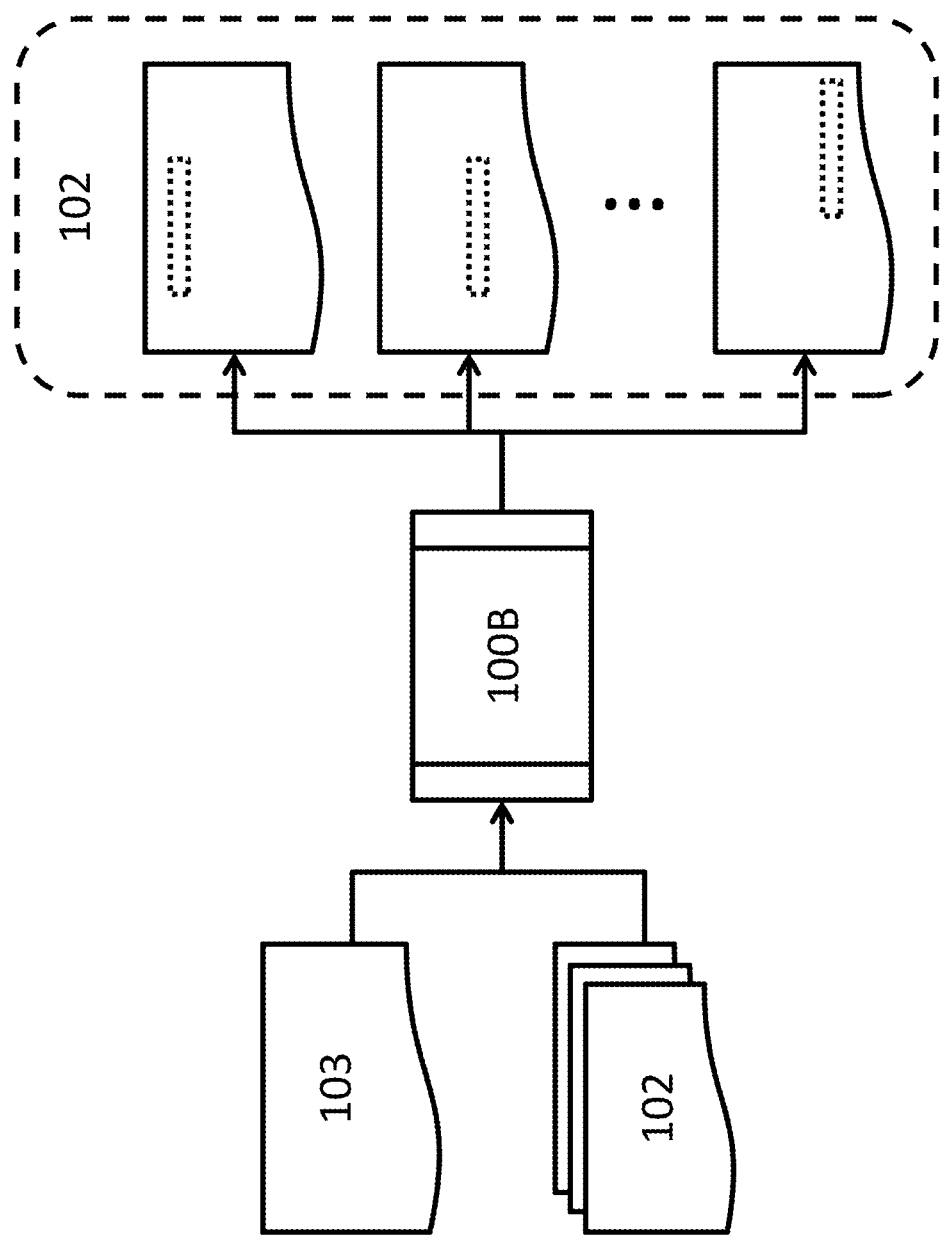
FIG. 1B schematically shows the function of a computer system that locates, in multiple documents, texts satisfying a criterion.

FIG. 1B schematically shows the function of a computer system 100B that locates, in multiple documents, texts satisfying a criterion. The computer system 100B receives multiple documents 102 and a criterion 103, analyzes the criterion 103 and the contents of the documents 102, and locates texts that satisfy the criterion 103 in the documents 102. For example, the criterion 103 may be having meanings related to a particular notion or having forms conforming to a particular pattern. The computer system 100B may determine whether a document among the documents 102 contains any text satisfying the criterion 103, and may determine where the text satisfying the criterion 103 is in that document. The computer system 100B may be used, for example, for exercising due diligence in a transaction. For example, the computer system 100B may locate portions among a set of contractual documents that contain provisions of potential interest such as intellectual property assignments or indemnities.

Figure 1C:
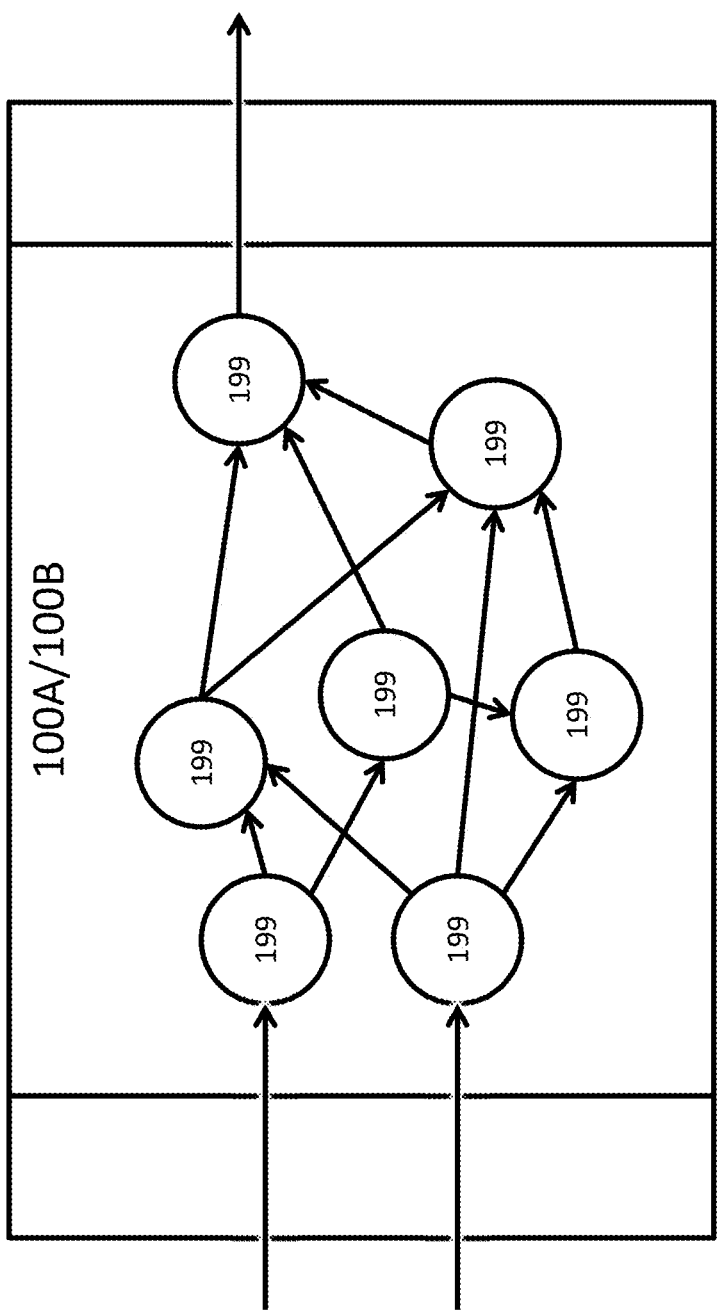
FIG. 1C schematically shows that the computer system of FIG. 1A or FIG. 1B may include a plurality of nodes that may collectively or individually have one or more processors.

FIG. 1C schematically shows that the computer system 100A or 100B may include a plurality of nodes 199. The nodes 199 may collectively or individually have one or more processors. The nodes 199 form a network by coupling with one another. The one or more processors determine the output of each node 199 as a function of outputs of some other nodes 199 or inputs into the computer system 100A or 100B. Couplings among the nodes 199 may have adjustable attributes such as the parameters of the function. Changing the attributes may change strengths of the couplings (i.e., the magnitudes of dependency among the outputs of the nodes 199) or the topology of the network.

Figure 2A:
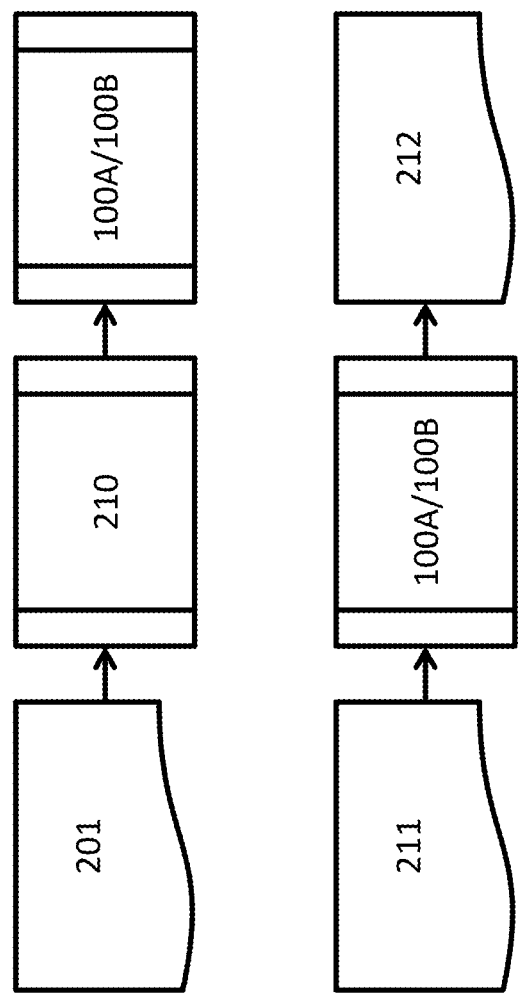
FIG. 2A schematically shows flowcharts of adjusting and using the computer system of FIG. 1A or FIG. 1B.

The computer system 100A or 100B may be adjusted (e.g., by changing the adjustable attributes of the couplings among the nodes 199) based on labeled data. FIG. 2A schematically shows flowcharts of adjusting and using the computer system 100A or 100B. Labeled data 201 are provided to a procedure 210, which adjusts the computer system 100A or 100B based on the labeled data 201. In the scenario of document classification, the labeled data 201 may include a set of documents and the classes they belong to. For example, the labeled data 201 may be a set of documents respectively labeled as "relevant" and "irrelevant." In the scenario of locating texts in documents, the labeled data 201 may include a set of documents and the location of texts satisfying the criterion 103 in these documents. After the computer system 100A or 100B is adjusted based on the labeled data 201, it can be used to label unlabeled data. Unlabeled data 211 are provided to the computer system 100A or 100B, which turns the unlabeled data 211 to labeled data 212.

Figure 2B:
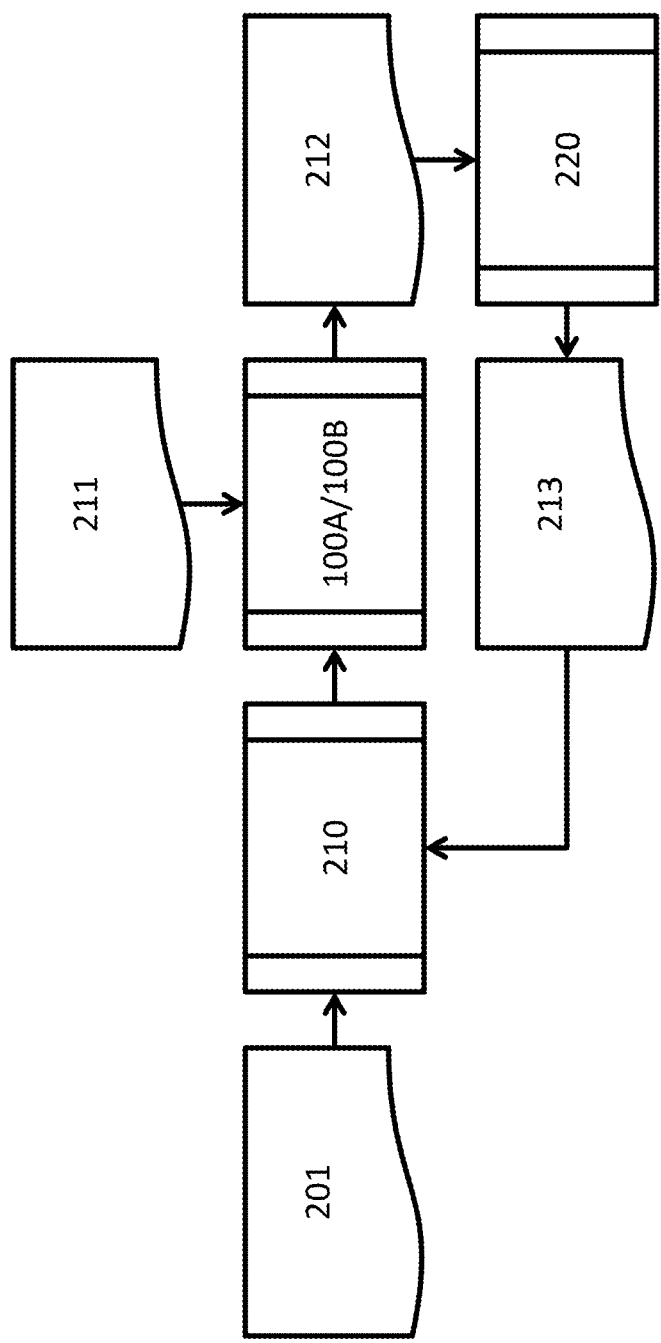
FIG. 2B schematically shows a flowchart of iteratively adjusting and using the computer system of FIG. 1A or FIG. 1B.

FIG. 2B schematically shows a flowchart of iteratively adjusting and using the computer system 100A or 100B. Labeled data 201 are provided to the procedure 210, which adjusts the computer system 100A or 100B based on the labeled data 201. Unlabeled data 211 are provided to the computer system 100A or 100B, which turns the unlabeled data 211 to labeled data 212. Validated data 213 are produced by validating the labeled data 212 in a procedure 220, in which the labels in the labeled data 212 are either upheld or overturned. The validation in the procedure 220 may be by a manual review of the labeled data 212 or by using another computer system. The validated data 213 are then provided to the procedure 210 to further adjust the computer system 100A or 1008. Validation may be performed after the computer system 100A or 1008 produces each of the labeled data 212 or after the computer system 100A or 1008 produces a batch of the labeled data 212.

The computer system 100A or 1008 may be probabilistic. In the scenario of document classification, the unlabeled data 211 include a set of documents to be classified and the computer system 100A or 1008 gives a score to each of the documents, where the score represents the probability of that document falling within a particular class (e.g., the "relevant" class or the "irrelevant" class). The scores may or may not be provided to the user of the computer system 100A or 1008. The documents in the unlabeled data 211 may be ranked based on their scores. A threshold may be applied on the scores and documents with scores above the threshold are allocated into one class and the documents with scores below the threshold are allocated into another class. A bias may be applied to the threshold. Adjusting the bias allows shifting documents among different classes.

Figure 3:
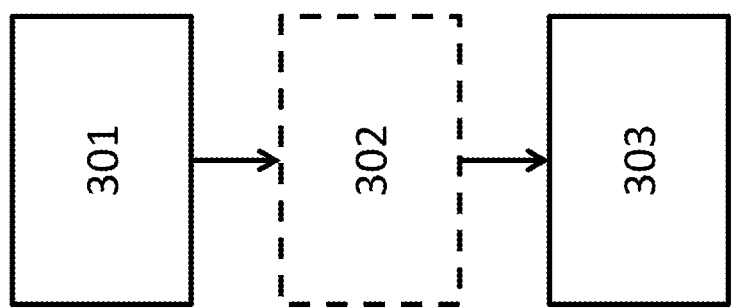
FIG. 3 schematically shows a flowchart of a method according to an embodiment.

FIG. 3 schematically shows a flowchart of a method according to an embodiment. In procedure 301, a target of accuracy of the computer system 100A or 1008 is obtained. The accuracy of the computer system 100A or 1008 may be a function of true positives, false positives, true negatives or false negatives of the computer system 100A or 1008. For example, the accuracy of the computer system 100A or 1008 may be a function of the "precision" or "recall" of the computer system 100A or 1008. The precision is defined as the ratio of the number of true positives to the sum of the number of true positives and the number false positives, with respect to one of the classes. The recall is defined as the ratio of the number of true positives to the sum of the number of true positives and the number false negatives, with respect to one of the classes. In the scenario of document classification, the precision may be the fraction that is actually relevant among the documents the computer system 100A or 100B has classified as relevant; the recall may be the fraction the computer system 100A or 100B has classified as relevant among all the documents that are actually relevant. The accuracy of the computer system 100A or 100B may be a function of the F-score of the computer system 100A or 1008. The F-score is the harmonic mean of the precision and recall. The target of accuracy may be obtained based on a measure of risks caused by errors of the computer system 100A or 1008. The user of the computer system 100A or 100B may provide subjective measures of risks for a number of different measures of the accuracy and provide a confidence threshold (e.g., a threshold between acceptable risks and unacceptable risks). For example, a user may consider the precision of 30%, 70%, 90% and 99% respectively as being catastrophic, severe, acceptable and satisfactory, respectively, and require a confidence threshold of 90%. The qualitative answers of "catastrophic," "severe," "acceptable" and "satisfactory" may be respectively assigned confidence levels of 1%, 50%, 80% and 100%. A statistical model may be used to ascertain the target of accuracy (the precision in this example) based on the subjective measures of risks and the confidence threshold.

In procedure 303, the accuracy of the computer system 100A or 100B is tuned by adjusting a characteristic of the computer system 100A or 100B based on the target of accuracy. In an example, the characteristic is an amount of training of the computer system 100A or 1008. The amount of training may be the amount of labeled data 201 or a combination of the amount of labeled data 201 and the amount of validated data 213. In another example, the characteristic is an amount of output validation of the computer system 100A or 1008. The amount of output validation may be the amount of validated data 213 or the frequency or sample rate of the validation in the procedure 220. In yet another example, the characteristic is the bias of the computer system 100A or 100B.

The method may include an optional procedure 302, in which a measure of accuracy of the computer system 100A or 100B is determined and adjusting the characteristic in procedure 303 includes comparing the measure of accuracy with the target of accuracy.

An example of adjusting the characteristic that is the amount of validated data 213 is explained below. In this example, the computer system 100A or 100B is probabilistic. The N unvalidated documents $(D_1, D_2, \ldots, D_n, \ldots, D_N)$ in the labeled data 212 thus respectively have scores, where each of the scores represents the probability of the corresponding document falling within a particular class (e.g., the "relevant" class). Under a hypothesis $H_m$ on the values of the largest score $p_{1,m}$ and the smallest score $p_{N,m}$ among all the scores, the score $p_{n,m}$ for document $D_n$ is assumed to be a function of the largest score $p_{1,m}$ and the smallest score $p_{N,m}$: $p_{n,m} = f(p_{1,m}, p_{N,m})$. In an example, the function $f$ is a harmonic function:

$$p_{n,m} = \frac{1}{\left(1 - \frac{n-1}{N-1}\right)\frac{1}{p_{1,m}} + \left(\frac{n-1}{N-1}\right)\frac{1}{p_{N,m}}}.$$

The hypothesis $H_m$ has a credibility $C_m$ that is the probability of the hypothesis $H_m$ correctly estimating the value of the largest score as $p_{1,m}$ and the value of the smallest score as $p_{N,m}$. If no prior assumption exists about the values of the largest score and the smallest score, the credibilities of all the M hypotheses may be equal: $C_m=1/M$.

After the document $D_n$ in the labeled data 212 is validated, the credibilities ($C_1, C_2, \ldots, C_m, \ldots, C_M$) for the M hypotheses are adjusted using the Bayesian inference. If the document $D_n$ is validated as being in the particular class (e.g., the "relevant" class), a factor of $p_{n,m}/Z$ is applied to the credibilities; if the document $D_n$ is validated as not being in the particular class (e.g., the "relevant" class), a factor of $(1-p_{n,m})/Z$ is applied to the credibilities, where Z is a normalization factor that keeps $\Sigma_m C_m=1$ after the adjustment. Then, for the hypothesis $H_m$, a cumulative probability $Q_m$ of the target of accuracy of the computer system 100A or 100B having been met is calculated from the scores; and an aggregate probability $R=\Sigma_m Q_m C_m$ is calculated. If the aggregate probability R of the target of accuracy of the computer system 100A or 100B having been met reaches the confidence threshold (e.g., 90%), tuning the computer system 100A or 100B may cease.

Figure 4A:
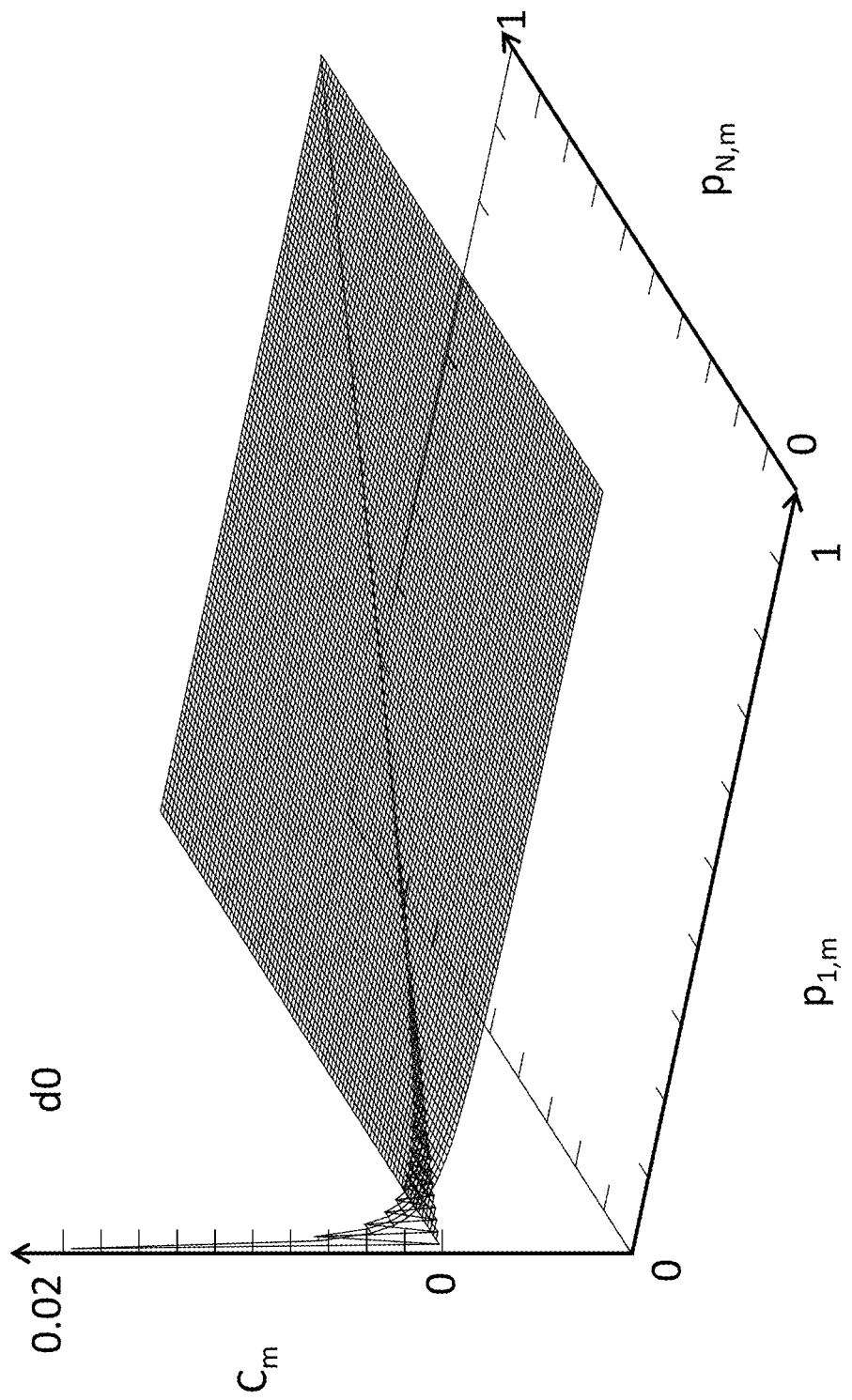
FIG. 4A-FIG. 4E show the progress of the credibilities in an example, where the actual value of the largest score is 0.8 and the actual value of the smallest score is 0.1.
Figure 4B:
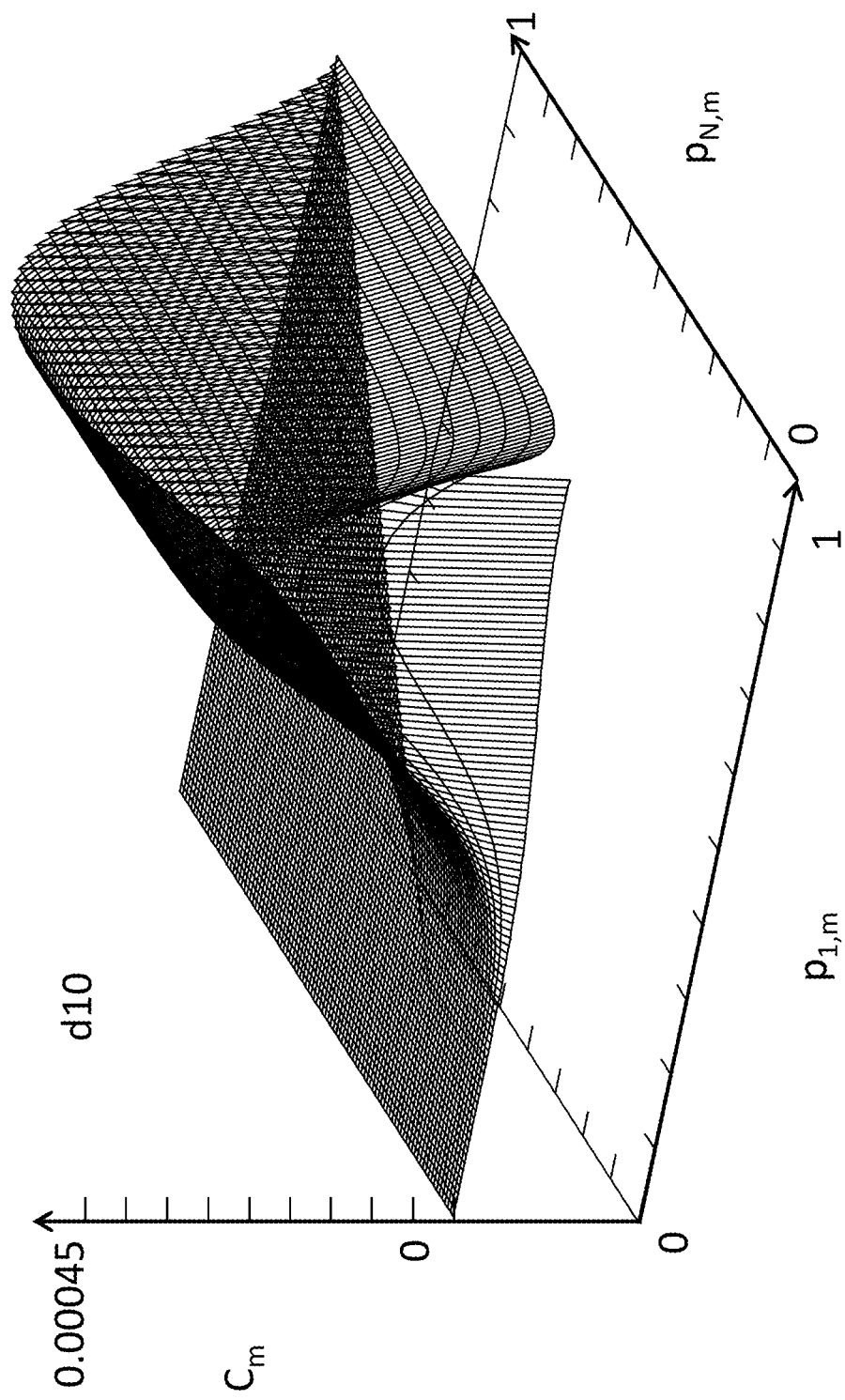
Figure 4C:
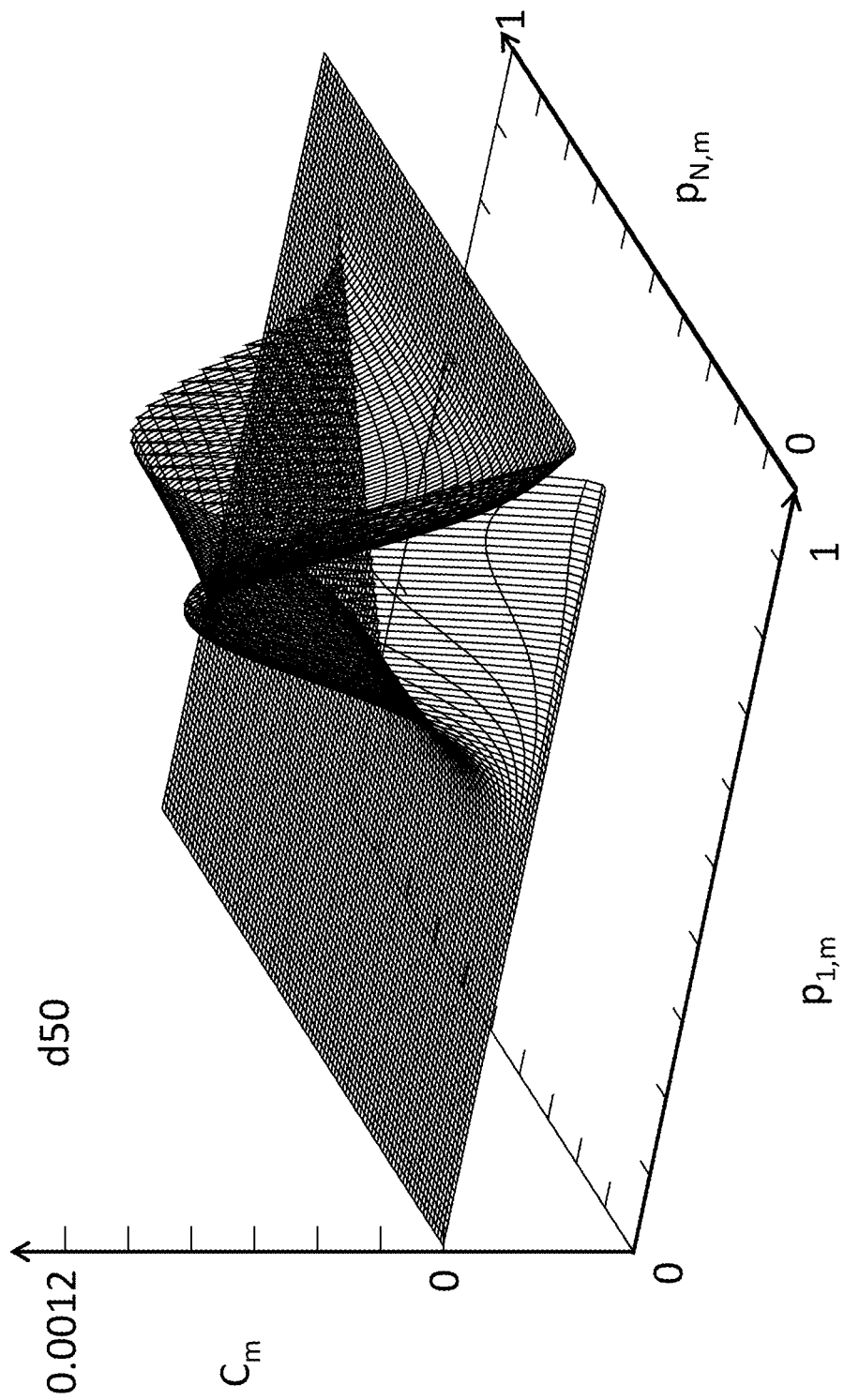
Figure 4D:
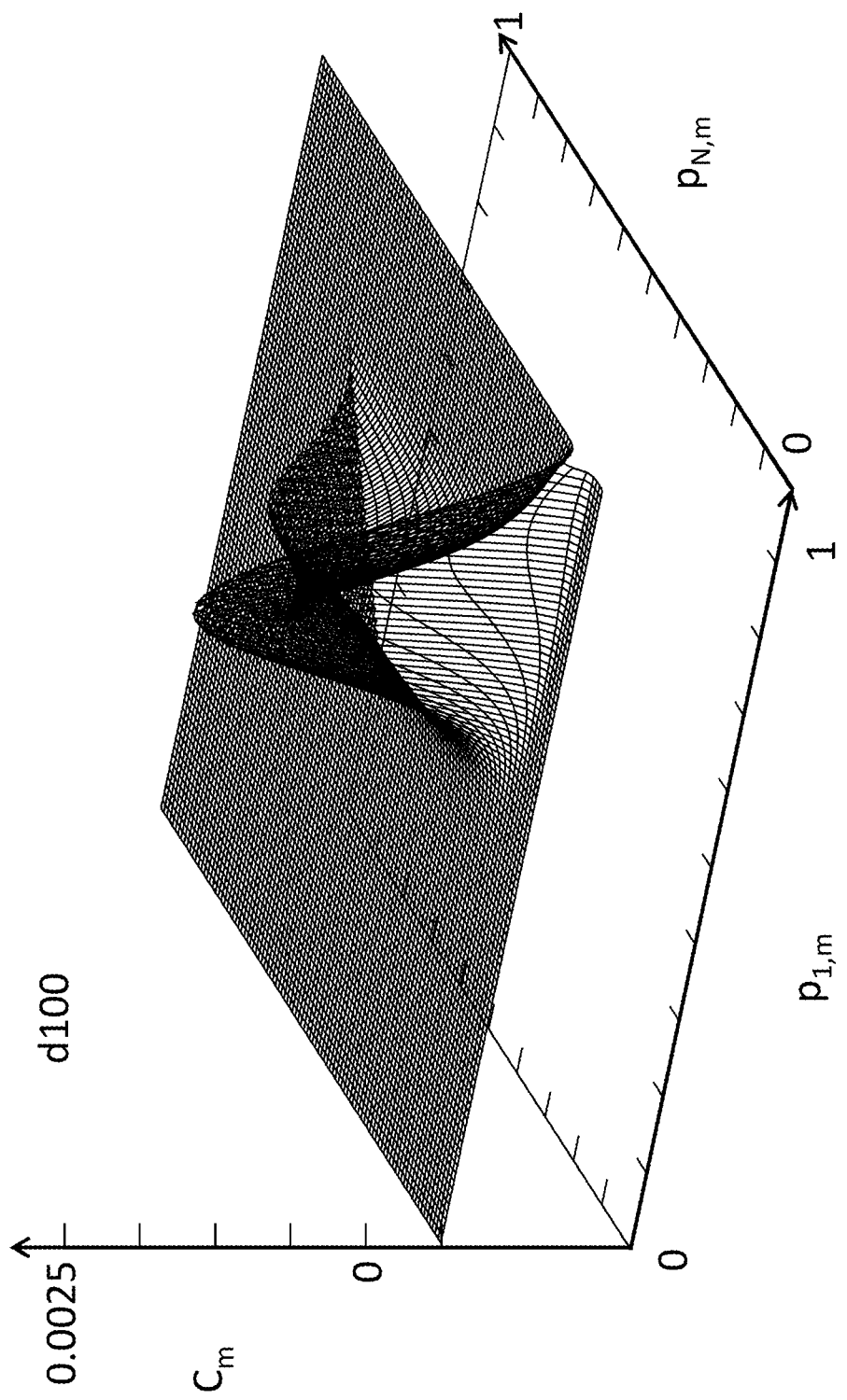
Figure 4E:
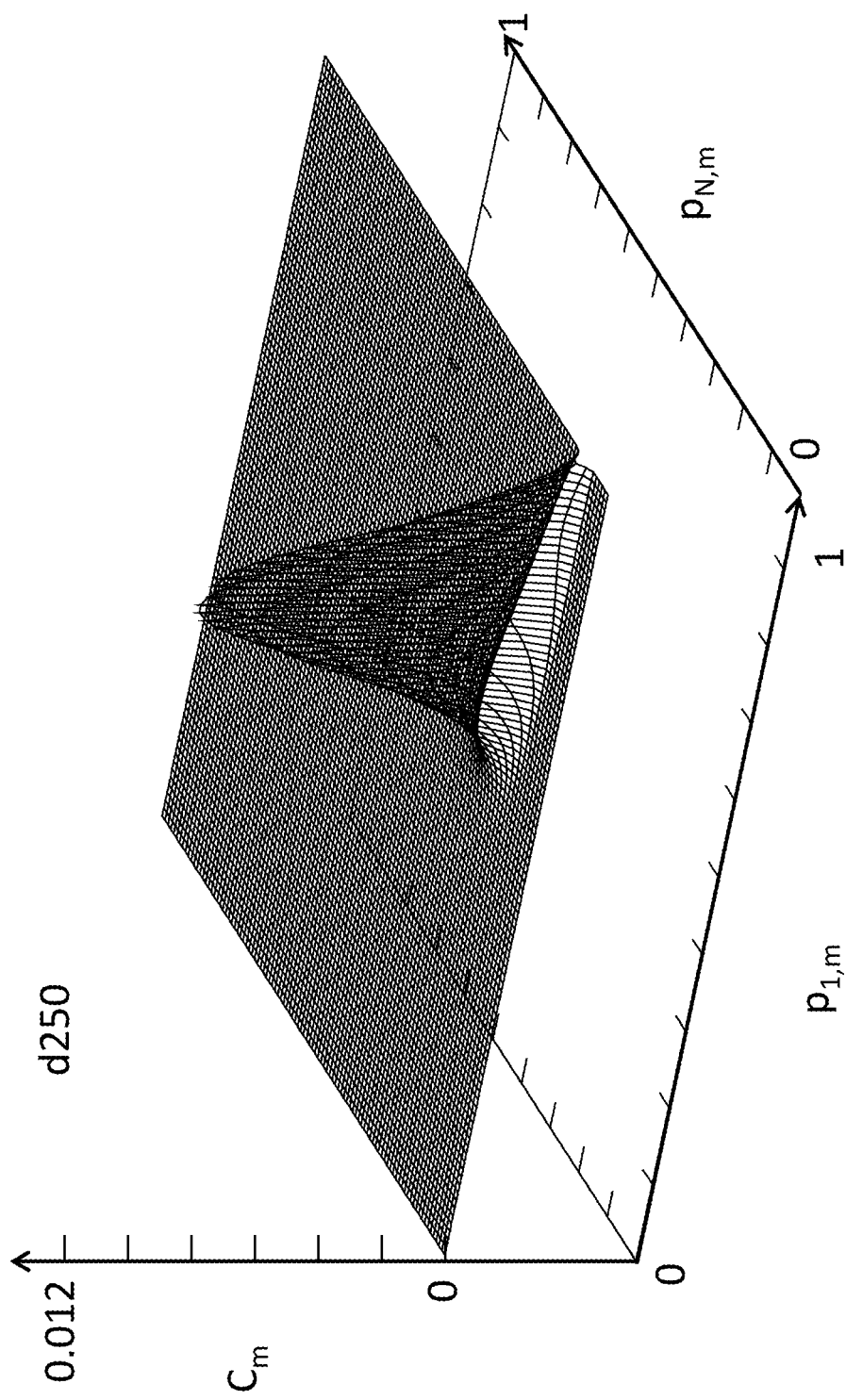

FIG. 4A-FIG. 4E show the progress of the credibilities in an example, where the actual value of the largest score is 0.8 and the actual value of the smallest score is 0.1. FIG. 4A-FIG. 4E respectively show the credibilities after 0, 10, 50, 100 and 250 documents have been validated. Even after only 10 documents have been validated, as shown in FIG. 4B, the hypotheses on the value of the largest score being near 0.8 are already favored (i.e., having higher credibilities). By the time when 50 documents have been validated, as shown in FIG. 4C, the hypotheses with high values of the smallest score are disfavored (i.e., their credibilities dropping). By the time when 250 documents have been validated, as shown in FIG. 4E, only those hypotheses close to the actual value of the largest score of 0.8 and the actual value of the smallest score of 0.1 are favored.

The method disclosed herein may be embodied in a computer program product. The computer program product includes a non-transitory computer readable medium having instructions recorded thereon, the instructions when executed by a computer implementing the method disclosed herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   obtaining a target of accuracy of a computer system configured to classify documents or to locate texts satisfying a criterion in documents;
   determining classification of a set of documents or location of the texts satisfying the criterion in the set of documents thereby labeling the set of documents, using the computer system, wherein the set of documents are previously unlabeled;
   performing validation of the classification or the location of the texts, in which the classification or the location is either upheld or overturned; and
   tuning the accuracy of the computer system by adjusting an amount of the validation based on the target;
   wherein adjusting the amount of the validation comprises:
   for each of the set of documents and each of a plurality of hypotheses on a largest value and a smallest value of scores for the set of documents, the scores respectively representing probabilities of the classification or location of the texts of the set of documents, generating a hypothesized score as a function of the largest value and the smallest value;
   initializing credibilities respectively for the hypotheses as an equal value, the credibilities respectively representing probabilities of the hypotheses correctly estimating their respective largest value and smallest value; and
   adjusting the credibilities using Bayesian inference, based on the hypothesized scores for the set of documents and the hypotheses and results of the validation.

2. The method of claim 1, wherein obtaining the target is based on a measure of risks caused by errors of the computer system.

3. The method of claim 1, further comprising determining a measure of the accuracy; wherein tuning the accuracy of the computer system further comprises comparing the measure with the target.

4. The method of claim 1, wherein tuning the accuracy of the computer system further comprises adjusting an amount of training of the computer system.

5. The method of claim 1, wherein the computer system is configured to iteratively receive the validation.

6. The method of claim 1, wherein tuning the accuracy of the computer system further comprises adjusting a bias of the computer system.

7. The method of claim 1, wherein the computer system comprises a plurality of nodes, the nodes comprising one or more processors; wherein tuning the accuracy of the computer system further comprises adjusting an attribute of couplings among the nodes.

8. The method of claim 1, wherein the computer system is configured to classify the documents into a plurality of classes.

9. The method of claim 1, wherein the computer system is probabilistic.

10. The method of claim 1, wherein the accuracy is a function of true positives, false positives, true negatives or false negatives of the computer system.

11. The method of claim 1, wherein the accuracy is a function of precision, recall or F-score of the computer system with respect to a class.

12. The method of claim 1, further comprising:
   calculating a cumulative probability of the target of accuracy having been met for each of the hypotheses;
   calculating an aggregate probability of the target of accuracy based on the cumulative probability and the credibilities; and
   ceasing tuning of the computer system when the aggregate probability of the target of accuracy reaches a confidence threshold.

13. The method of claim 1, wherein the function is a harmonic function of the largest value and the smallest value.

14. A computer program product comprising a non-transitory computer readable medium having instructions recorded thereon, the instructions when executed by a computer implementing a method comprising:
   obtaining a target of accuracy of a computer system configured to classify documents or to locate texts satisfying a criterion in documents;
   determining classification of a set of documents or location of the texts satisfying the criterion in the set of documents thereby labeling the set of documents, using the computer system, wherein the set of documents are previously unlabeled;

performing validation of the classification or the location of the texts, in which the classification or the location is either upheld or overturned; and tuning the accuracy of the computer system by adjusting an amount of the validation based on the target;

wherein adjusting the amount of the validation comprises:
for each of the set of documents and each of a plurality of hypotheses on a largest value and a smallest value of scores for the set of documents, the scores respectively representing probabilities of the classification or location of the texts of the set of documents, generating a hypothesized score as a function of the largest value and the smallest value;

initializing credibilities respectively for the hypotheses as an equal value, the credibilities respectively representing probabilities of the hypotheses correctly estimating their respective largest value and smallest value; and adjusting the credibilities using Bayesian inference, based on the hypothesized scores for the set of documents and the hypotheses and results of the validation.

15. The computer program product of claim 14, wherein obtaining the target is based on a measure of risks caused by errors of the computer system.

16. The computer program product of claim 14, wherein the method further comprises determining a measure of the accuracy; wherein tuning the accuracy of the computer system further comprises comparing the measure with the target.

17. The computer program product of claim 14, wherein tuning the accuracy of the computer system further comprises adjusting an amount of training of the computer system.

18. The computer program product of claim 14, wherein the computer system is configured to iteratively receive the validation.

19. The computer program product of claim 14, wherein tuning the accuracy of the computer system further comprises adjusting a bias of the computer system.

20. The computer program product of claim 14, wherein the computer system comprises a plurality of nodes, the nodes comprising one or more processors; wherein tuning the accuracy of the computer system further comprises adjusting an attribute of couplings among the nodes.

21. The computer program product of claim 14, wherein the computer system is configured to classify the documents into a plurality of classes.

22. The computer program product of claim 14, wherein the computer system is probabilistic.

23. The computer program product of claim 14, wherein the accuracy is a function of true positives, false positives, true negatives or false negatives of the computer system.

24. The computer program product of claim 14, wherein the accuracy is a function of precision, recall or F-score of the computer system with respect to a class.

25. The computer program product of claim 14, wherein the method further comprises:
calculating a cumulative probability of the target of accuracy having been met for each of the hypotheses;
calculating an aggregate probability of the target of accuracy based on the cumulative probability and the set of credibilities; and
ceasing tuning of the computer system when the aggregate probability of the target of accuracy reaches a confidence threshold.

26. The computer program product of claim 14, wherein the function is a harmonic function of the largest value and the smallest value.

* * * * *